United States Patent
Roush et al.

(10) Patent No.: US 7,699,382 B2
(45) Date of Patent: Apr. 20, 2010

(54) TRAILER WITH AERODYNAMIC REAR DOOR

(75) Inventors: Mark A. Roush, Lafayette, IN (US); Keith Wallace, Lafayette, IN (US)

(73) Assignee: Vanguard National Trailer Corp., Monon, IN (US)

( * ) Notice: Subject to any disclaimer, the term of this patent is extended or adjusted under 35 U.S.C. 154(b) by 0 days.

(21) Appl. No.: 12/115,511

(22) Filed: May 5, 2008

(65) Prior Publication Data

US 2008/0272617 A1 Nov. 6, 2008

Related U.S. Application Data

(60) Provisional application No. 60/927,614, filed on May 4, 2007, provisional application No. 61/070,669, filed on Mar. 25, 2008, provisional application No. 61/070,670, filed on Mar. 25, 2008.

(51) Int. Cl.
*B60J 5/12* (2006.01)
(52) U.S. Cl. ............... 296/186.3; 298/180.1; 298/180.4
(58) Field of Classification Search ............. 296/180.1, 296/180.4, 186.3, 50, 202, 146.1, 151, 146.8, 296/146.11
See application file for complete search history.

(56) References Cited

U.S. PATENT DOCUMENTS

| | | | |
|---|---|---|---|
| 609,789 A | 8/1898 | Capewell | |
| 1,922,027 A | 8/1933 | Carter | |
| 2,514,695 A | 7/1950 | Dempsey | |
| 2,569,983 A | 10/1951 | Alexandre | |
| 2,737,411 A | 3/1956 | Potter | |
| 3,118,702 A | 1/1964 | Kale | |
| 3,405,778 A | 10/1968 | Martin | |
| 3,415,566 A | 12/1968 | Kerrigan | |
| 3,934,635 A | 1/1976 | Kin | |
| 3,934,922 A | 1/1976 | Maccready | |
| 3,960,402 A | 6/1976 | Keck | |
| 3,995,563 A | 12/1976 | Blunden | |
| 3,999,797 A | 12/1976 | Kirsch | |
| 4,006,932 A | 2/1977 | Mcdonald | |
| 4,021,069 A | 5/1977 | Hersh | |
| 4,077,330 A | 3/1978 | Peisner | |
| 4,142,755 A | 3/1979 | Keedy | |
| 4,210,354 A | 7/1980 | Canning | |
| 4,214,787 A | 7/1980 | Chain | |
| 4,236,745 A | 12/1980 | Davis | |
| 4,257,641 A | 3/1981 | Keedy | |
| D266,158 S | 9/1982 | Sullivan | |
| 4,379,585 A * | 4/1983 | Strick ...................... | 296/146.8 |
| 4,403,804 A | 9/1983 | Mountz | |
| 4,437,410 A | 3/1984 | Stoller, Jr. | |

(Continued)

*Primary Examiner*—Joseph D Pape
(74) *Attorney, Agent, or Firm*—Dowell Baker, P.C.

(57) ABSTRACT

An aerodynamic cargo container with rounded rear doors is disclosed. The aerodynamic cargo container includes an angled rear area that reduces base drag when the container is transported. The rear sliding door allows for partial opening of the door and allows for operation of the door when the rear of the container is in close proximity to another object. The crash attenuating skirt deflects vehicles away from the cargo container. A pair of cargo doors may define the curved contour of the trailer rear section. These doors may have a plurality of pivoted and segmented sections that assume the curved contour of a stationary edge when the doors are moved to a closed position.

20 Claims, 21 Drawing Sheets

U.S. PATENT DOCUMENTS

| | | |
|---|---|---|
| 4,458,936 A | 7/1984 | Mulholland |
| D277,840 S | 3/1985 | Jacques |
| 4,624,074 A | 11/1986 | Shuttleworth |
| 4,649,831 A | 3/1987 | Burleson |
| 4,668,008 A | 5/1987 | Stinson |
| 4,682,808 A | 7/1987 | Bilanin |
| 4,785,494 A | 11/1988 | Adamski |
| 4,789,117 A | 12/1988 | Paterson |
| 4,924,780 A | 5/1990 | Hart |
| 4,991,347 A | 2/1991 | Takimoto |
| 5,058,756 A | 10/1991 | Green |
| 5,236,347 A | 8/1993 | Andrus |
| 5,384,975 A | 1/1995 | Yuran |
| 5,659,926 A | 8/1997 | Dietrich |
| 6,286,894 B1 | 9/2001 | Kingham |
| 6,297,486 B1 | 10/2001 | Rom |
| 6,409,194 B1 | 6/2002 | Voas |
| 6,467,833 B1 | 10/2002 | Travers |
| 6,554,047 B1 | 4/2003 | Mondragon |
| 6,623,234 B1 | 9/2003 | Herring |
| 7,008,005 B1 | 3/2006 | Graham |
| 7,165,804 B2 | 1/2007 | Shahbazi |
| 2002/0030384 A1 | 3/2002 | Basford |
| 2004/0056029 A1 | 3/2004 | Petzitillo |

* cited by examiner

FIG. 24A
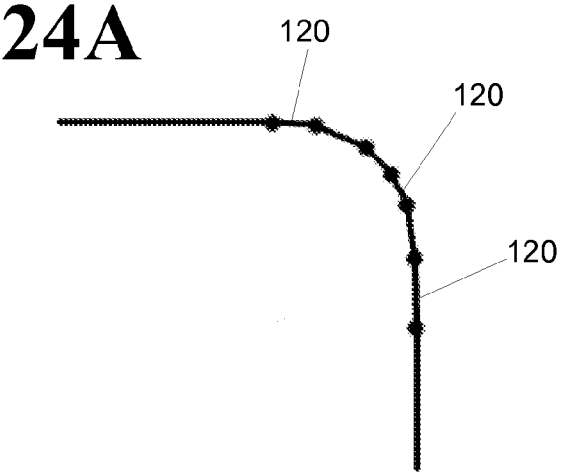
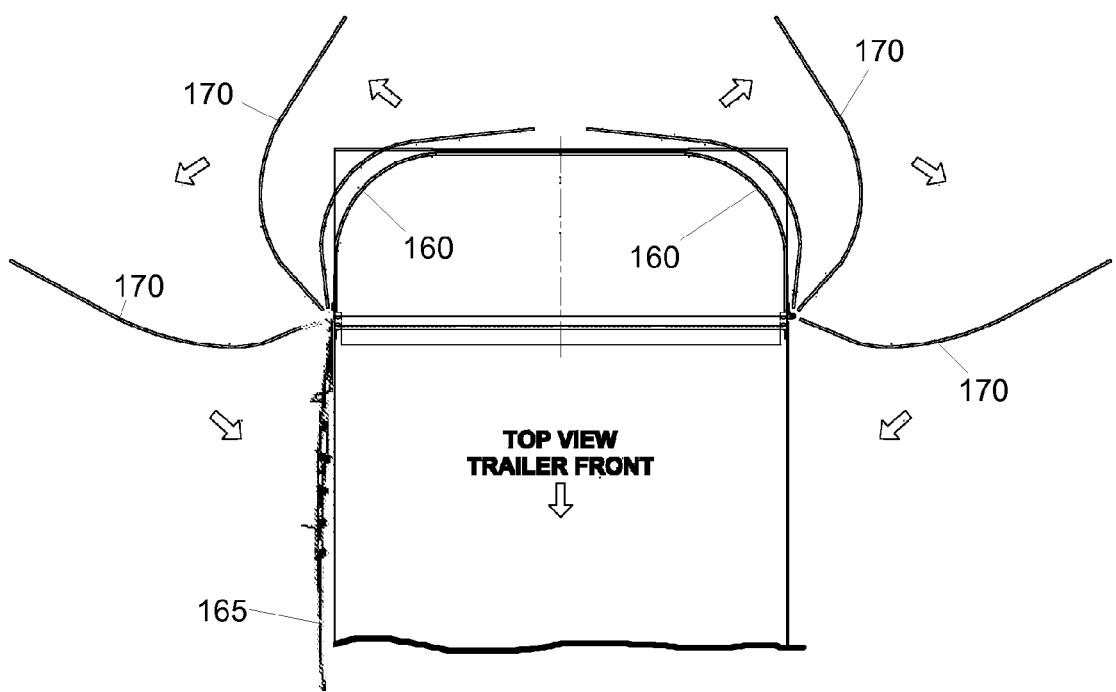
FIG. 24

TRAILER WITH AERODYNAMIC REAR DOOR

CROSS-REFERENCE TO RELATED APPLICATION

This application claims priority to provisional application Ser. No. 60/927,614, entitled "Aerodynamic trailer with sliding rear door" filed May 4, 2007 and provisional applications Ser. Nos. 61/070,669 and 61/070,670 filed Mar. 25, 2008 entitled "Rounded Cargo Doors for Trailers and Trucks" and "Drag Reduction Arrangement for Cargo Trucks and Trailers" to Mark Roush, the contents of which are all incorporated herein by reference.

FIELD OF THE INVENTION

This invention relates to a trailer design. More specifically, it relates to a cargo container with improved aerodynamic efficiency, sliding or slatted rear doors, and a crash attenuating rear skirt.

BACKGROUND OF THE INVENTION

There are many types of cargo containers. There are cargo containers designed to be loaded onto ocean going ships. There are cargo containers specially shaped to fit into the curved hulls of airplanes. There are cargo containers that are transported by train. Cargo containers are often transported as trailers by trucks.

There are several problems associated with cargo containers. One problem is that the rectangular shape of the container creates drag that hinders the transport of the container. It is desirable to have an aerodynamic cargo container that reduces drag.

A drag force acts on an object which moves in a fluid environment such as air or water. This drag force includes several specific drag forces wherein the main one is known as a pressure drag force. The pressure drag force is caused by a net pressure force acting on the object. The rear end contribution to the pressure drag is called "base drag". Flow separation at the base of the moving object creates a vortex system and reduces base pressure thus increasing drag. This problem exists for truncated objects, which have blunt bases, such as a box, a cylinder and the like. Drag forces on the trailer reduce the fuel efficiency of the truck pulling the trailer, and increase the cost of transporting the cargo container. It is desirable to reduce the cost in transporting a cargo container.

Another problem is that automobiles often crash into the rear of trailers causing injury to the automobile and passengers. It is desirable to have a trailer that is designed to reduce the damage caused to automobiles and passengers that crash into the rear of a trailer.

Another problem is that cargo containers pulled by trucks must often be moved into close proximity to a loading dock so that the cargo can be loaded or unloaded. The hinged doors of a cargo container can limit how close a cargo container can be positioned to a loading dock. It is desirable to have a cargo container that can be opened while in close proximity to a loading dock.

There have been attempts to solve some of these problems. For example, U.S. Pat. No. 6,286,894 that issued to Kingham teaches a transportable hauling container, such as a trailer of a tractor-trailer combination, has a rear portion that is configured in or convertible to a wedge shape. Movable portions are located at the rear sides of the trailer that can pivot inward toward a longitudinal centerline. Movable flaps also are located at the rear top of the trailer, which can pivot downward in alignment with the movable portions. The movable portions and flaps can be secured relative to each other in various combinations, thereby providing a more aerodynamic configuration of the trailer rear end. The container or trailer can be configured in such an arrangement, or be convertible from a standard configuration which also includes doors at the rear of the trailer, to a more aerodynamic configuration. A method is also disclosed, which includes operations for converting such a convertible trailer between the standard and aerodynamic configurations.

For example, U.S. Pat. No. 4,924,780 that issued to Hart teaches a rail car enclosure having a bottom deck, sidewalls and a curved roof defined by at least one slope on each side connecting a flat top of the roof with the sidewalls and the deck connecting the opposite end of each sidewall to form an open end of the rail car. At least one intermediate deck extending between and connecting the sidewalls. An upper track mounted on the uppermost intermediate deck and a bottom track mounted on the bottom deck such that the upper track and bottom track curve around the sidewalls of the rail car. A plurality of panels hinged together at the marginal edges thereof to form a left and right door to slide on the upper and bottom curved tracks between a closed and stowed position. The doors parallel to the exterior of the sidewalls in the stowed position and standing substantially in one plane to fill the open end of the rail car in the closed position.

U.S. Pat. No. 4,236,745 that issued to Davis teaches a truck body streamlining device, and more specifically to a collapsible, pivoted rear door attachment which when deployed in its operative position forms a reduced air drag surface on the rear of the truck body to minimize the wind resistance of the vortex which normally forms at the rear of a square backed truck.

U.S. Pat. No. 4,077,330 that issued to Peisner teaches an end closure for a rail car which comprises a pair of sliding doors mounted for movement between open and closed positions. One of the doors has a recess to clear a brake lever when the door is open. A panel is provided to close the recess when the door is closed. The panel is automatically moved to a position opening the recess when the door is opened and automatically moved to a position closing the recess when the door is closed.

U.S. Pat. No. 3,995,563 that issued to Blunden teaches an end closure for a rail car which comprises a pair of sliding doors. Locking mechanisms provided for securing the doors in closed position extending across the end of the rail car as well as in open and in intermediate positions. Each door moves from closed to open position through an opening in the side wall of the rail car to an open space on the outer side of the side wall within the allowed rail car clearance.

Thus, it is desirable to provide a cargo container with an improved aerodynamic design, doors that can be operated while the container is in close proximity to a loading dock, and a rear skirt that attenuates the damage caused to automobiles that crash into the rear of the container.

SUMMARY OF THE INVENTION

In accordance with preferred embodiments of the present invention, some of the problems associated with cargo containers are overcome. A cargo trailer with improved aerodynamic efficiency, sliding rear doors, and a crash attenuating rear skirt is presented.

The cargo container includes an aerodynamic rear design that reduces the base drag on the container when it is transported. The cargo container may further include a crash attenuating skirt that contains angled sections that deflects vehicles away from the truck. The cargo container may further include rear sliding doors.

The cargo container may have a pair of cargo doors at the rear of the container which themselves define the rear curvature of the container structure. These doors may each have pivoted segmented sections that assume the curved contour of an edge when the doors are moved to a closed position. When opened, the doors each can be fully flattened out against the sides of the trailer to minimize side clearance needed and allow parking closely spaced from adjacent trailers in normal fashion at loading docks The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 24 is a top view of a trailer rear section showing the doors in various positions being opened.

FIG. 24A is a cross section of a rear door with pivoted segments in a closed position.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to the figures.

Figure 1:
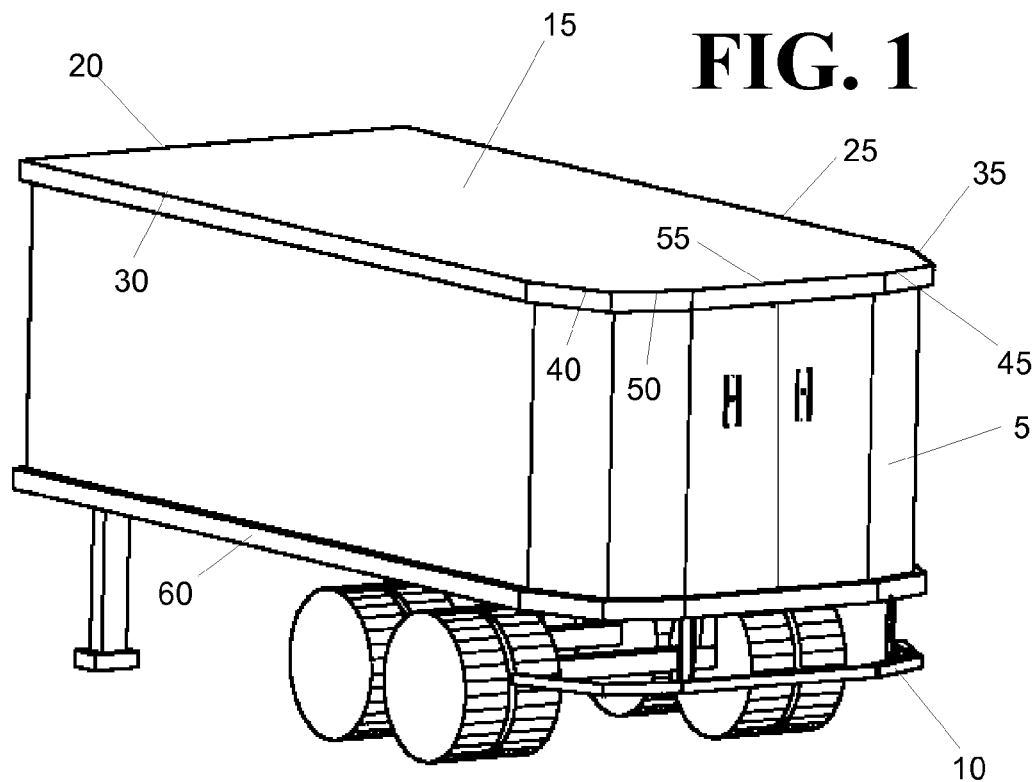
FIG. 1 is a perspective view of a trailer with 5 sided rear section.

FIG. 1 illustrates an exemplary embodiment of the aerodynamic cargo container with a rear sliding door 5 and a crash attenuating skirt/underride guard 10. In this embodiment, the cargo container is in the form of a truck trailer. The container has a roof 15 with a front roof edge 20, first and second side edges (25 and 30), first and second fore edges (35 and 40), first and second aft edges (45 and 50) and a rear edge 55. The container also has a floor 60 with edges similar to and parallel to those of the roof. Eight flat sections connect the roof and the floor. The eights flat sides are a front flat section, a first and second side flat section, and five flat rear sections. The five rear sections are two fore angled rear sections, two aft angled rear sections, and a back flat section. To each side flat section is connected a fore angled rear section, and to each fore angled rear section is a connected to an aft rear angled section. The back flat section is connected to both aft rear angled sections.

The rear doors of the trailer shown in FIG. 1 comprise the five flat rear sections of the trailer. The back flat section shown in FIG. 1 comprises two door handles for operating the rear doors, and two door panels that can be separated. When the rear doors of the trailer are operated, the fore and aft angled rear sections and the two door panels of the back rear section slide towards side flat section to which they are closest. The fore and aft angled rear sections and the two door panels slide along a path generally defined by the perimeter of the roof and floor.

FIG. 1 illustrates a crash attenuating skirt below the five flat rear sections of the cargo container. The crash attenuating skirt is connected to the floor of the trailer by at least one skirt connector. The crash attenuating skirt has segments which are angled towards the side sections of the trailer. An automobile crashing into the angled segments crash attenuating skirt would be diverted away from the trailer thereby reducing damage to the automobile and trailer.

Figure 2:
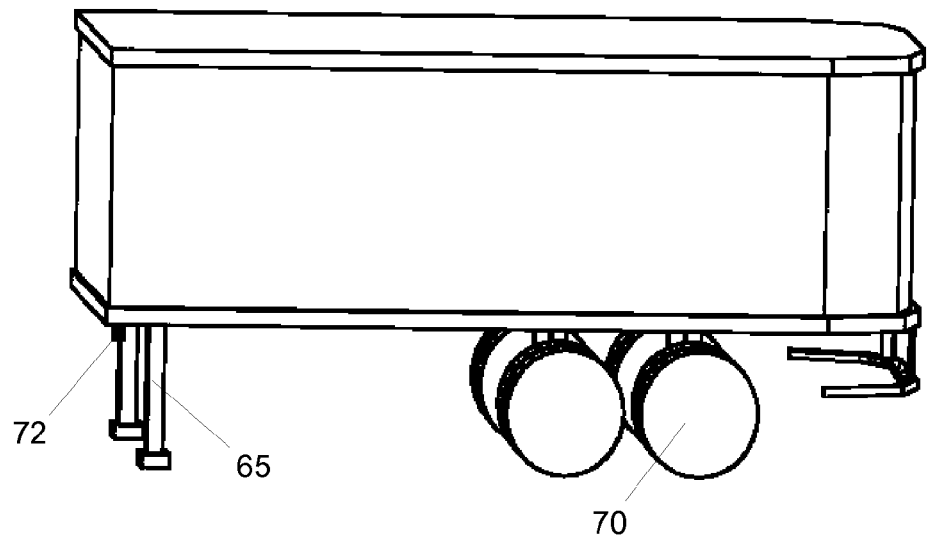
FIG. 2 is a view of a trailer with a 5 sided rear section with a rear bumper that follows the contour of the trailer.

FIG. 2 is a side view of the trailer showing the landing gear 65 and the wheel assembly 70, a kingpin 72 for connecting the trailer to a tractor is located near the landing gear. The angled segments of the crash attenuating skirt are highlighted.

Figure 3:
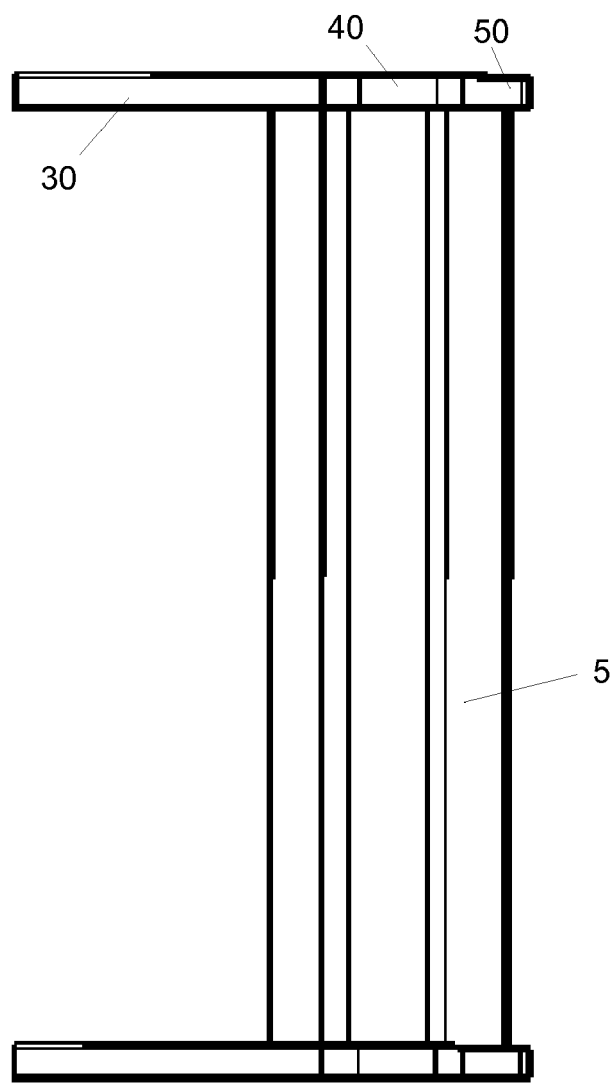
FIG. 3 is a side view of rear section of the trailer.

FIG. 3 is a side partial view of the trailer. The connections between the roof and the floor of the trailer are highlighted.

Figure 4:
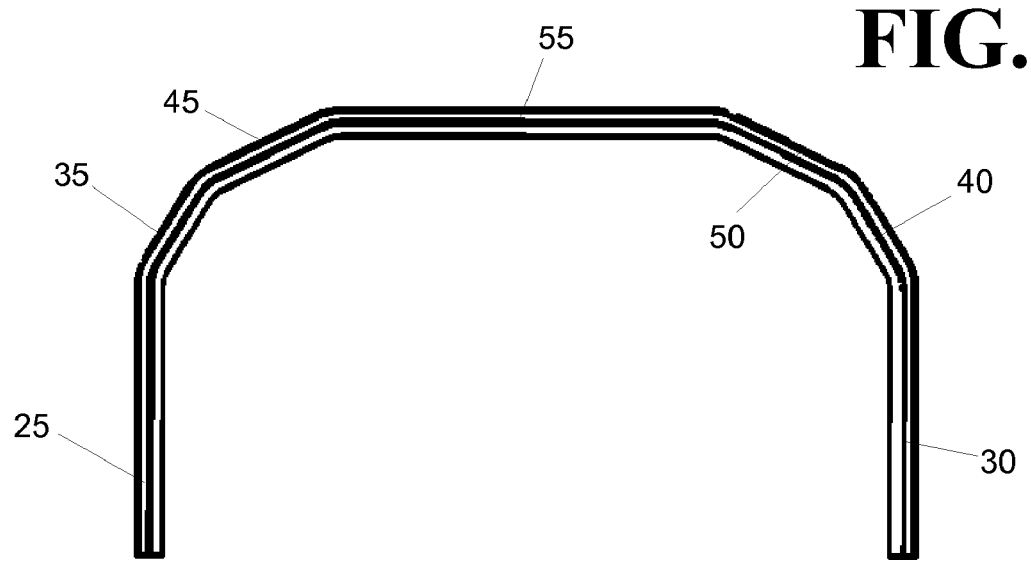
FIG. 4 is a top view of the rear section of the trailer

FIG. 4 is a top partial view of the trailer. The five flat rear sections, and part of the two side flat sections are shown.

Figure 5:
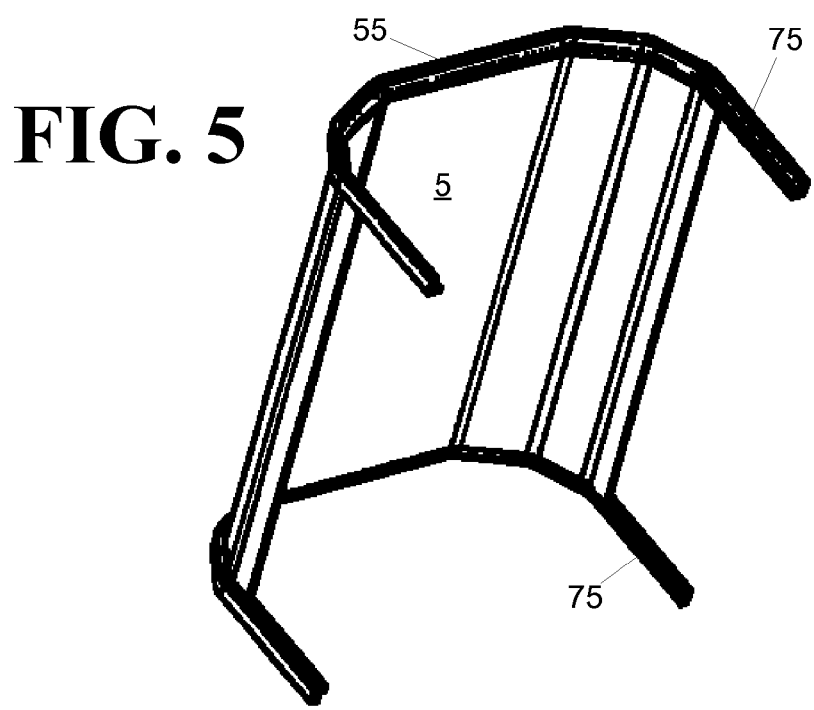
FIG. 5 shows the interior of the rear section of the trailer

FIG. 5 is a partial perspective view of the interior of the trailer. In this exemplary embodiment, the floor and roof of the trailer have integral grooves 75 along which the rear doors travel.

Figure 6:
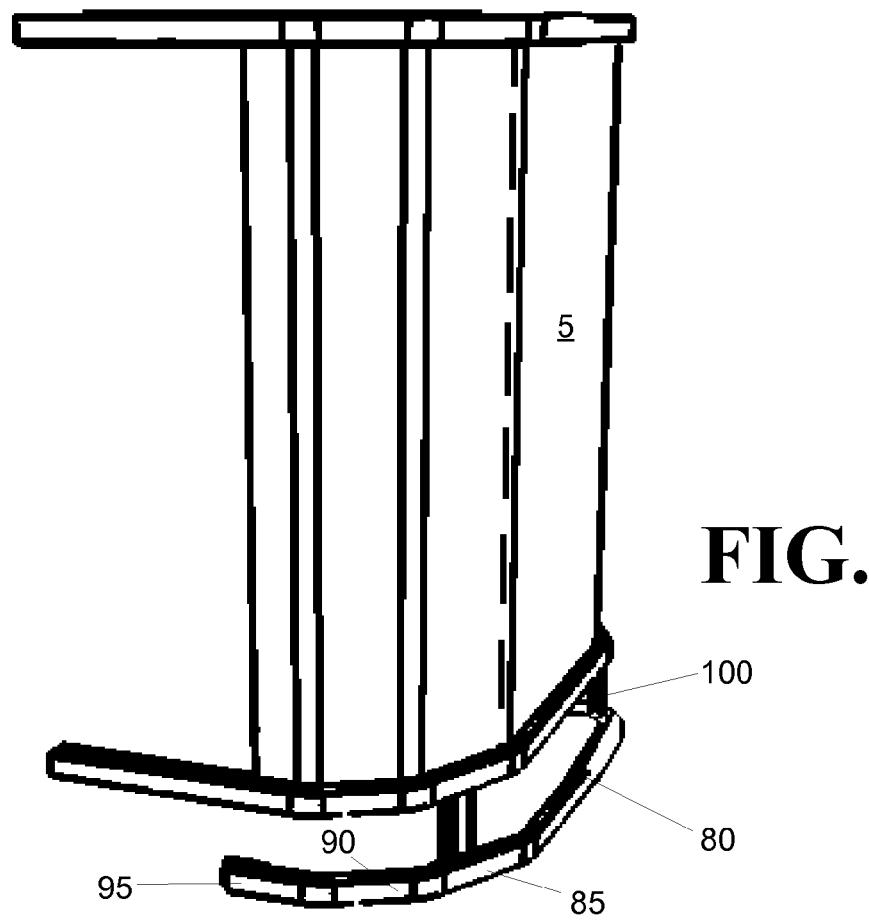
FIG. 6 is a view of the rear section of the trailer

FIG. 6 is a partial perspective view of the rear of the trailer and the crash attenuating skirt. A bar of the underride guard (skirt) oriented parallel to the rear edge of the floor 80 is shown. Also shown are portions of the guard oriented substantially parallel to the aft, fore, and side edges (85, 90, and 95 respectively). The posts 100 connecting the bar to the floor of the trailer are also illustrated.

Figure 7:
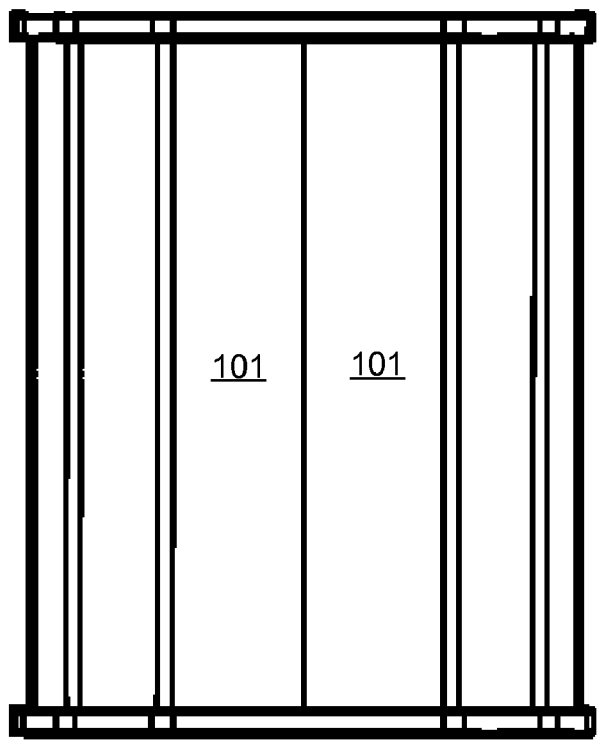
FIG. 7 is a back view of the trailer
Figure 8:
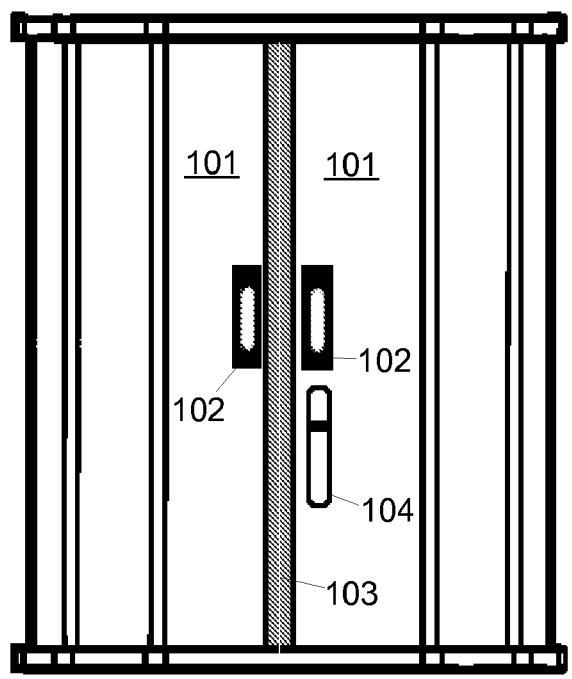
FIG. 8 is a back view of the trailer showing door handles for opening the rear doors, a locking device on the rear doors, and a sealing means between the two rear doors.

FIGS. 7 and 8 are back views of the rear of the trailer. In the embodiment illustrated in FIG. 8, each door panel of the back flat section 101 has a handle 102 for operating the doors. Each door panel has a sealing means 103 such as rubber, plastic, or vinyl. When the sealing means of one door panel presses against the sealing means of the other door panel, a watertight seal with improved insulation characteristics is formed. One of the door panels shown in FIG. 8 also comprises a locking means 104 to prevent the operation of the door.

Figure 9:
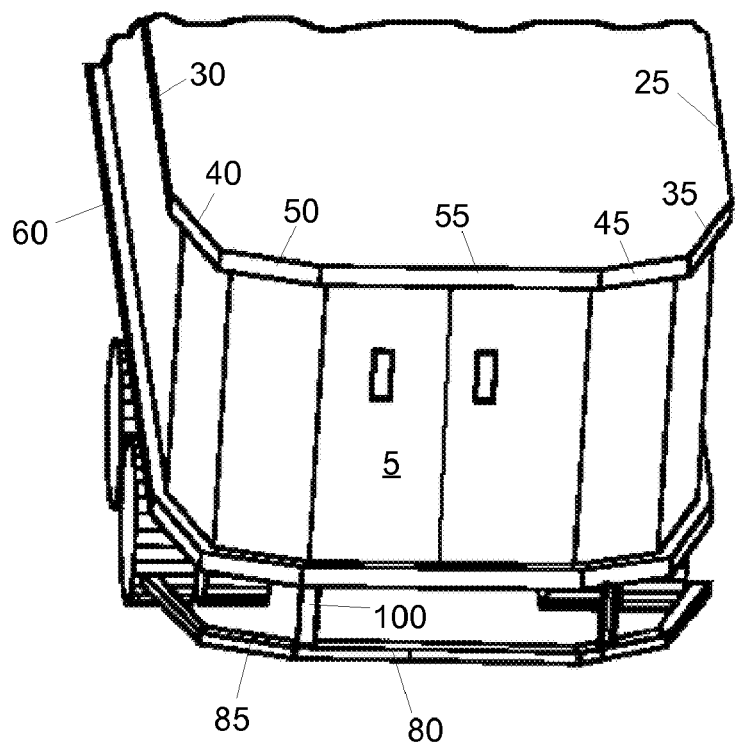
FIG. 9 is a back perspective view of the trailer highlighting the rear bumper following the contour of the trailer.

FIG. 9 is a back perspective partial view of the trailer.

Figure 10:
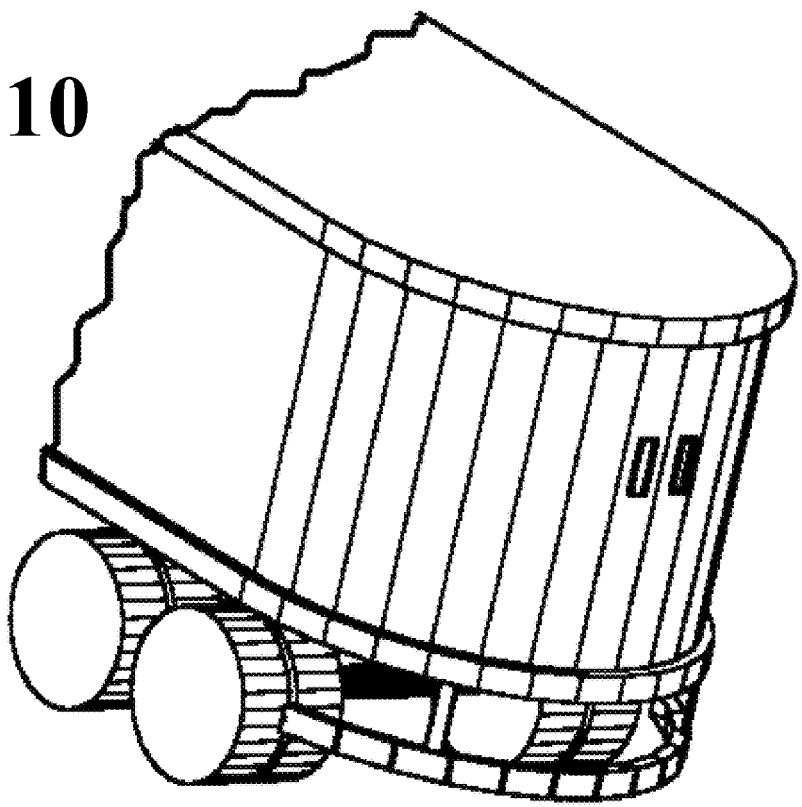
FIG. 10 is a view of a trailer with an 18 sided rear section, and a rear bumper that follows the contour of trailer.

FIG. 10 is a back perspective partial view of the trailer showing an embodiment of the trailer where there are eighteen rear flat sections. The crash attenuating skirt shown in FIG. 10 has more angled segments than the crash attenuating skirt shown in FIG. 9.

Figure 11:
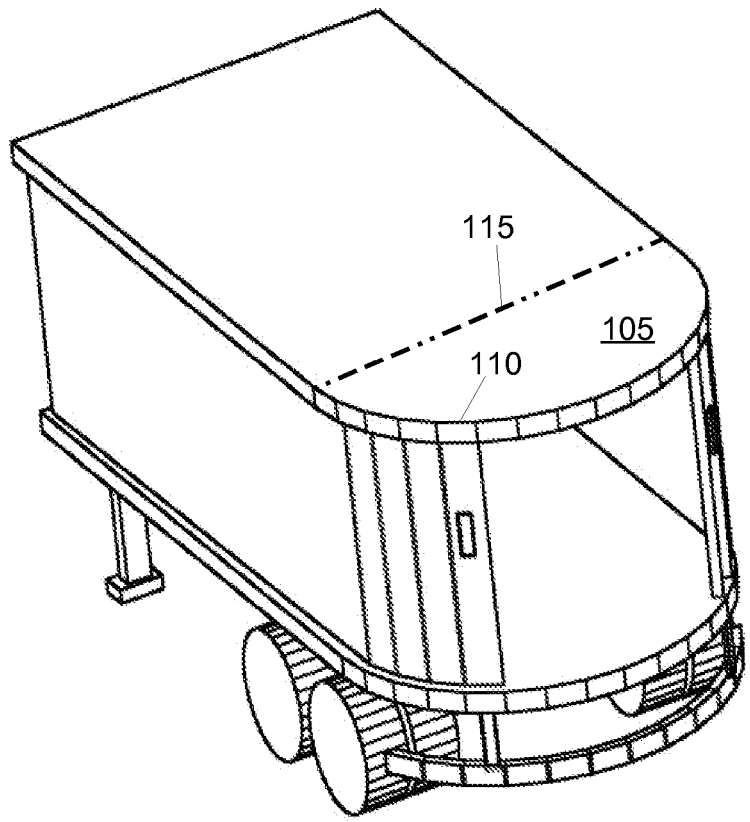
FIG. 11 is a view of a trailer with an 18 sided rear section, and a rear bumper that follows the contour of trailer. The rear doors of the trailer are open.

FIG. 11 illustrates a back perspective partial view of the trailer showing an embodiment of the trailer where there are eighteen rear flat sections. The rear doors shown in FIG. 11 are partially rolled away. Partially opening the doors of the trailer is desirable to reduce loss of refrigeration or heating. FIG. 11 further shows a rear roof section 105 with a horizontal surface that is bounded by a half circle 110 with a diameter 115 equal to the width of the trailer body. Although the diameter 115 of the half circle is shown, the rear roof section may also be be a circular section where with a chord that is substantially equal to the width of the trailer. The chord of a curve is a geometric line segment whose endpoints line on a curve.

Figure 12:
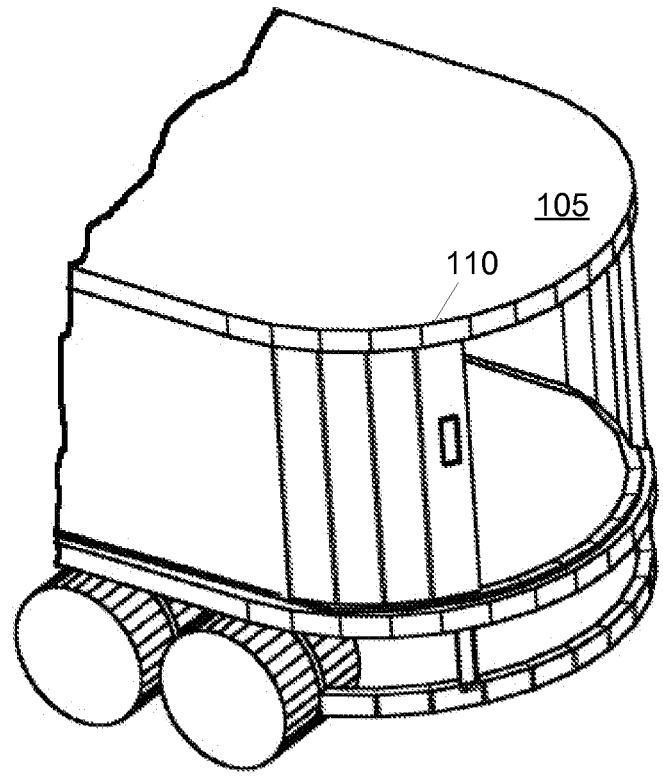
FIG. 12 is a view of a trailer with an 18 sided rear section, and a rear bumper that follows the contour of trailer. The rear doors of the trailer are open. The rear doors move along a track when the doors are operated.

FIG. 12 a back perspective partial view of the trailer showing an embodiment of the trailer where there are eighteen rear flat sections. In the embodiment of the invention shown, there is a track, attached to the floor of the trailer on which the rear doors slide. The rear doors can also hang from, or be guided by a track attached to the roof of the trailer.

Figure 13:
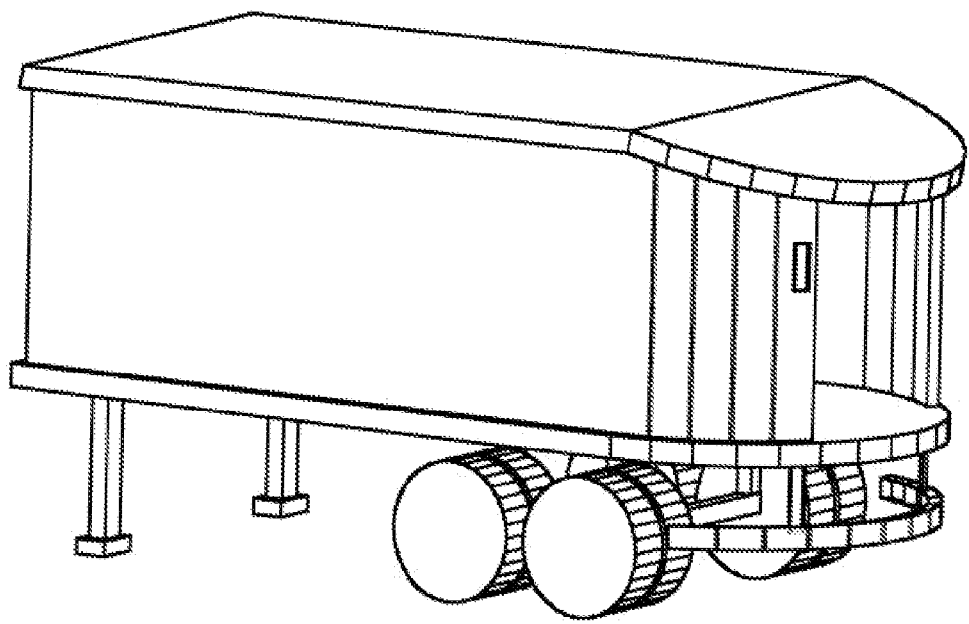
FIG. 13 is a view of a trailer with an 18 sided rear section, and a rear bumper that follows the contour of trailer. The trailer shown does not have a flat roof.

FIG. 13 a back perspective partial view of the trailer showing an embodiment of the trailer where there are eighteen rear flat sections. In this embodiment of the invention, the roof of the trailer is angled to further reduce base drag.

Figure 14:
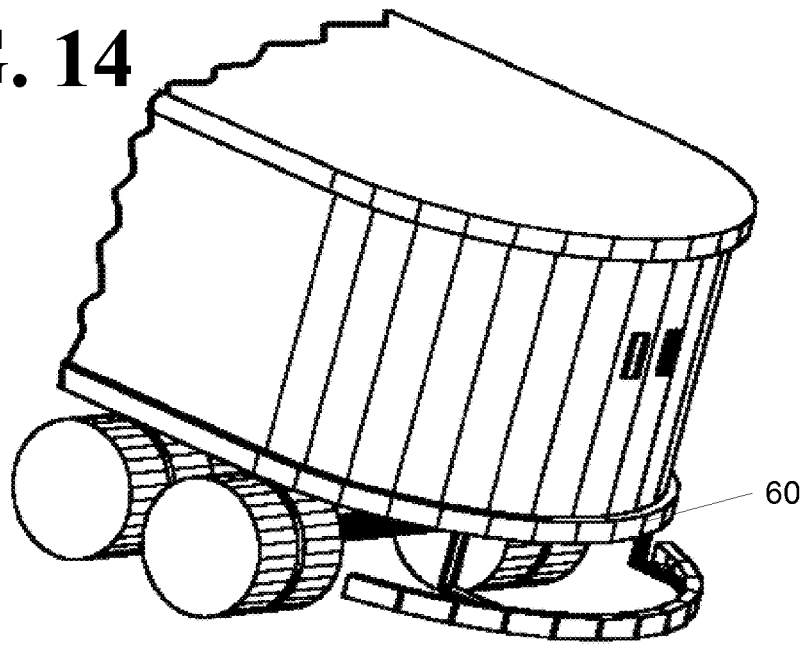
FIG. 14 is a view of a trailer with an 18 sided rear section. The rear bumper has a similar contour to the rear of the trailer, but is not directly below the trailer.

FIG. 14 a back perspective partial view of the trailer showing an embodiment of the trailer where there are eighteen rear flat sections. In this embodiment of the invention, the crash attenuating skirt is not directly below the floor 60 of the trailer.

Figure 15:
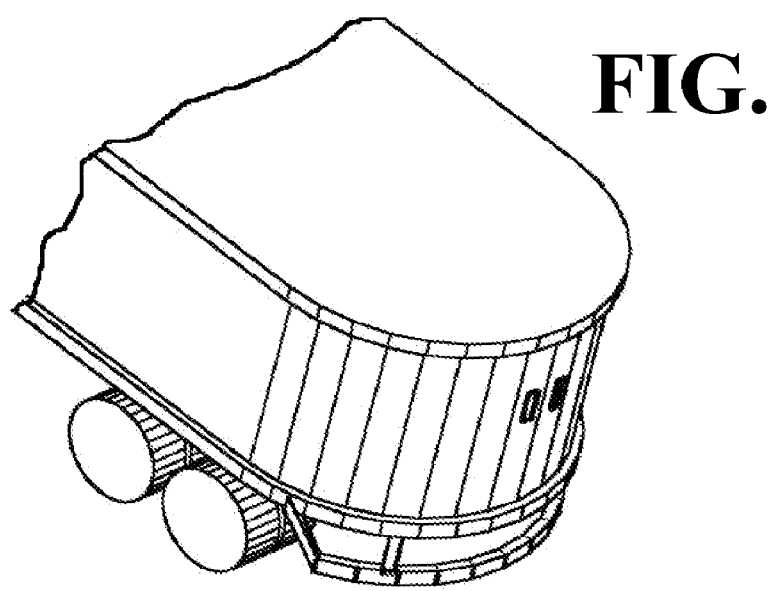
FIG. 15 is a view of a trailer with an 18 sided rear section. The rear bumper has a vertical angle.

FIG. 15 is a partial perspective view of the trailer illustrating an embodiment of the crash attenuating skirt that has segments angled towards the floor of the trailer.

Figure 16:
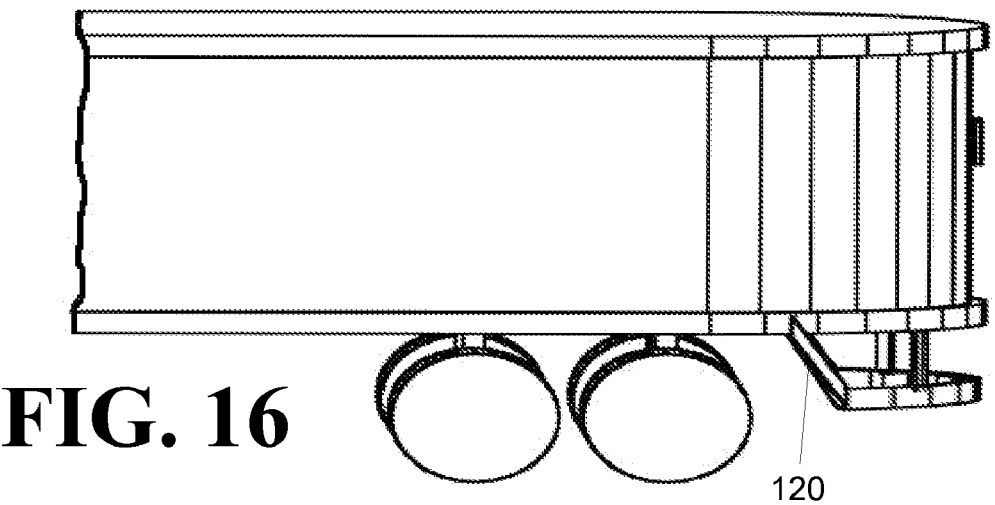
FIG. 16 is a side view of a trailer with an 18 sided rear section. The rear bumper has a vertical angle.

FIG. 16 is a partial side view of the trailer illustrating an embodiment of the crash attenuating skirt that has segments angled towards the floor of the trailer. The angled side bar 120 connects to both the floor of the trailer and other portions of the rear underride guard.

Figure 17:
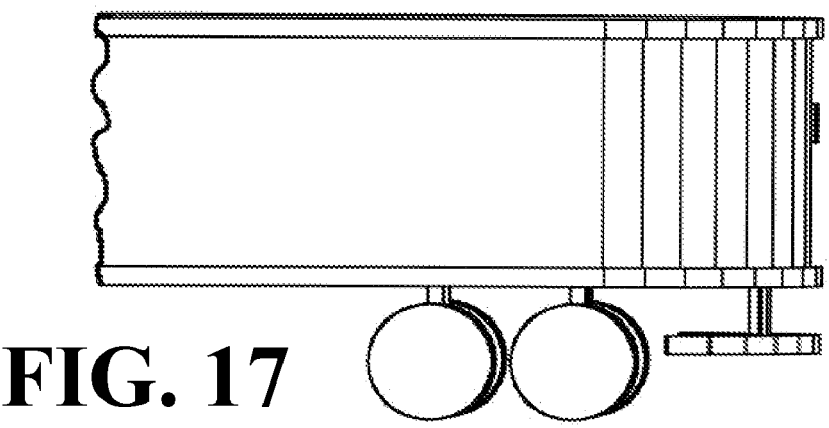
FIG. 17 is a side view of a trailer with an 18 sided rear section.

FIG. 17 is a partial side view of the trailer illustrating an embodiment of the crash attenuating skirt that has does not have segments angled towards the floor of the trailer.

Figure 18:
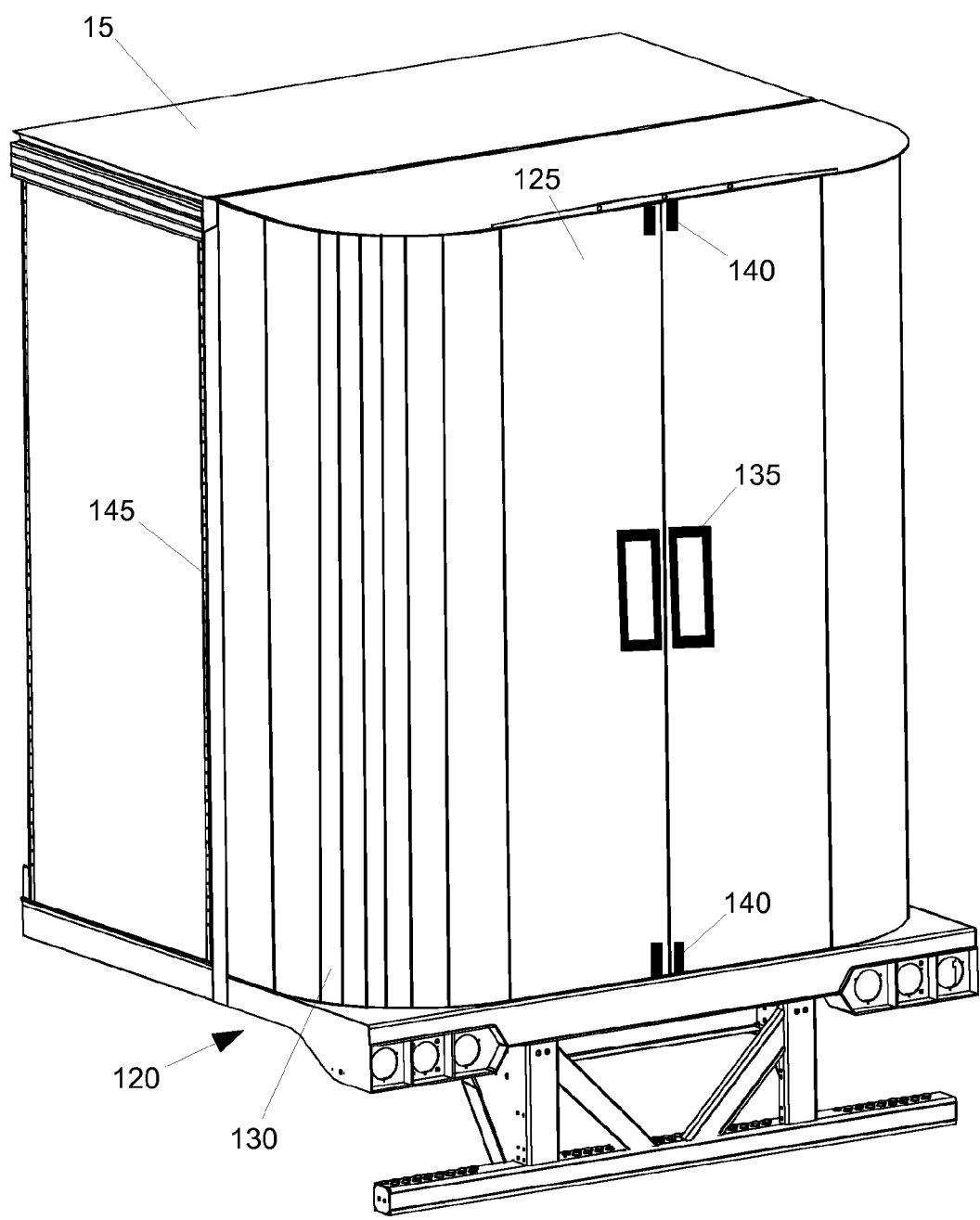
FIG. 18 is a perspective view of a trailer with slatted rear doors.

FIG. 18 shows a perspective view a trailer with flexible rear door made from interconnected pivoted slats 120 having a plurality of pivoted slats. In the door illustrated, there are both wide slats 125 and thin slats 130, but in other embodiments the slats may have a homogenous width. The flexible door is secured to another flexible door through a latching mechanism 135. The flexible door may also be secured to the roof and floor of the trailer with locks 140 connected to the door. The door is further secured to trailer sidewall with a hinge mechanism 145 that the door may rotate around.

Figure 19:
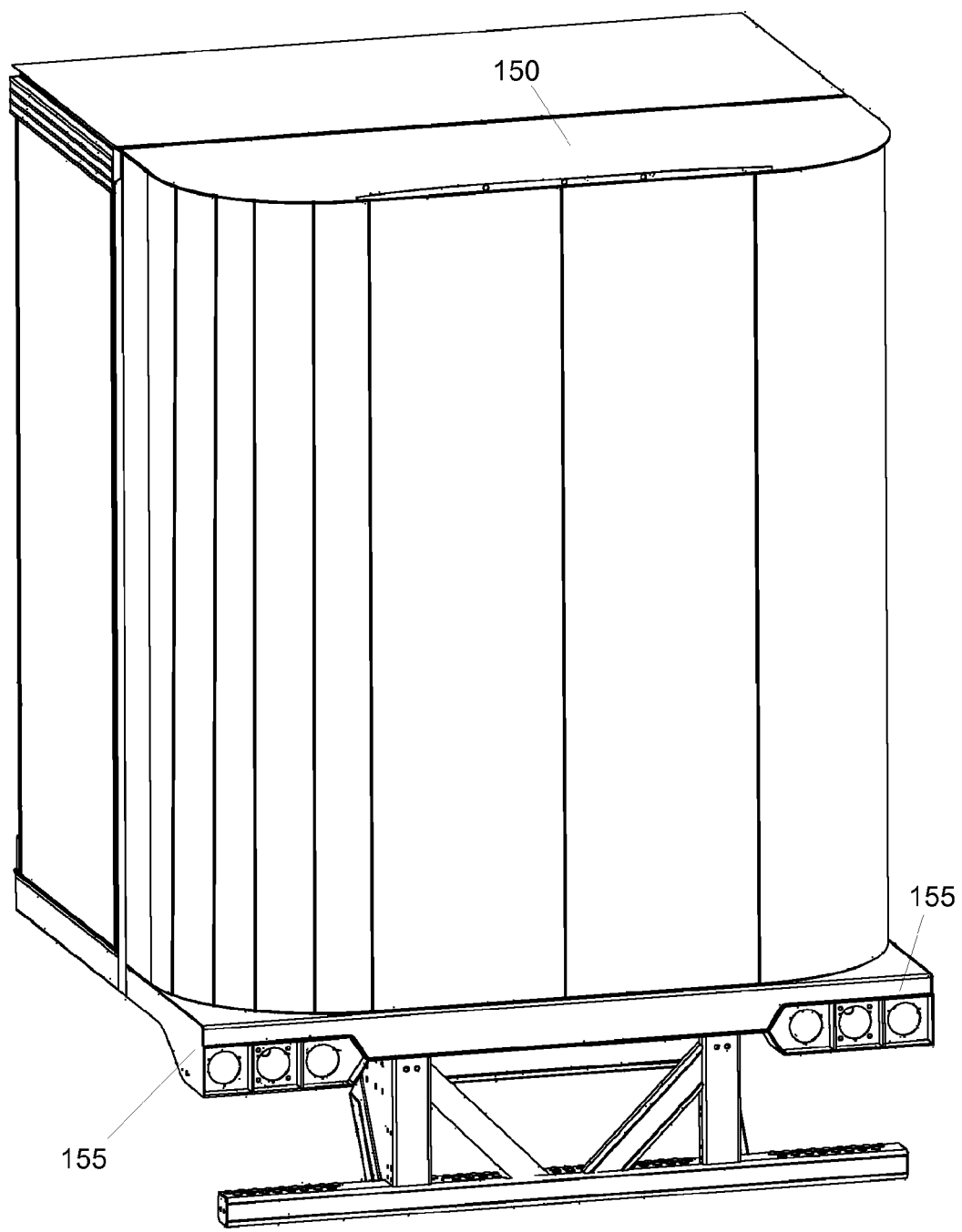
FIG. 19 is another perspective view of a trailer with slatted rear doors.

FIG. 19 shows another perspective view of the flexible door. The top of the flexible door is secured to a rounded overhang 150 that may or may not be an integral part of the trailer roof. The trailer shown has floor with squared corners 155 that facilitates rolling of cargo pallets onto the trailer.

Figure 20:
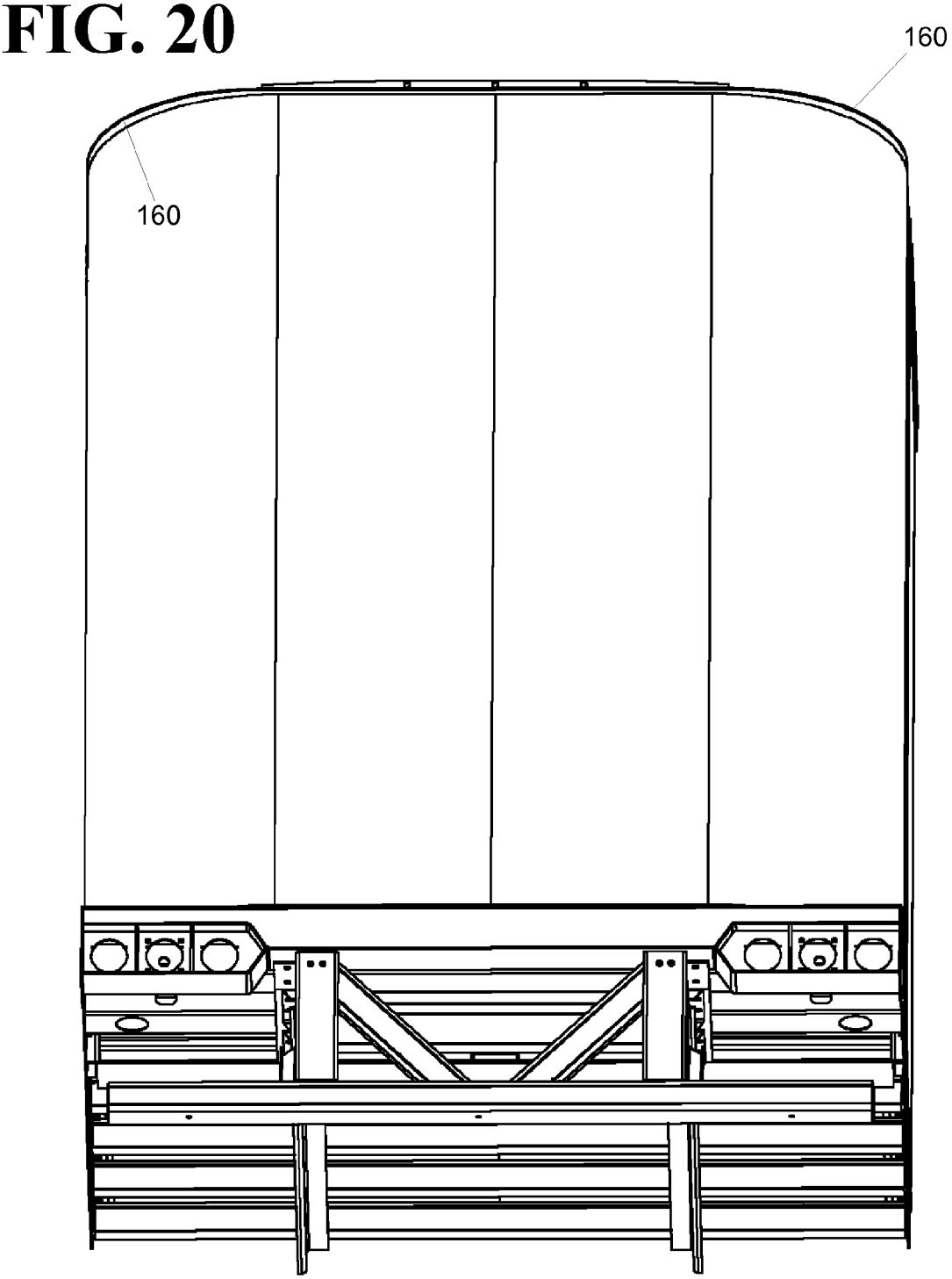
FIG. 20 is an upward view of a trailer with slatted rear doors.

FIG. 20 shows a trailer where the roof has rounded rear corners 160 to reduce the base drag of the trailer. In another embodiment of the invention, the roof corners are squared to match the corners of the floor. Alternatively, the floor corners may be rounded to further decrease the base drag of the trailer.

Figure 21:
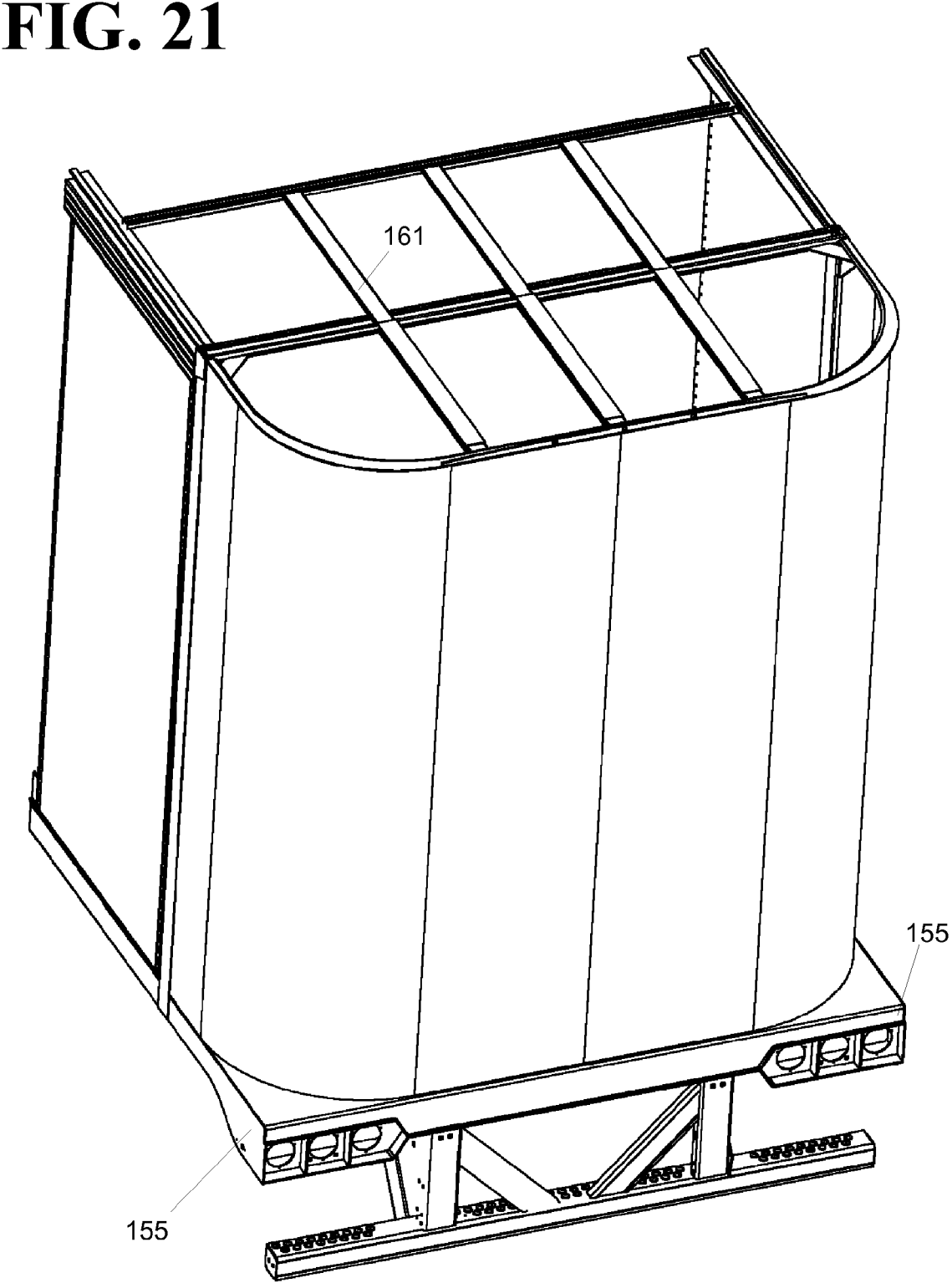
FIG. 21 is a pictorial downward view of a trailer section from the top with the roof covering removed to show the overhang structure.
Figure 22:
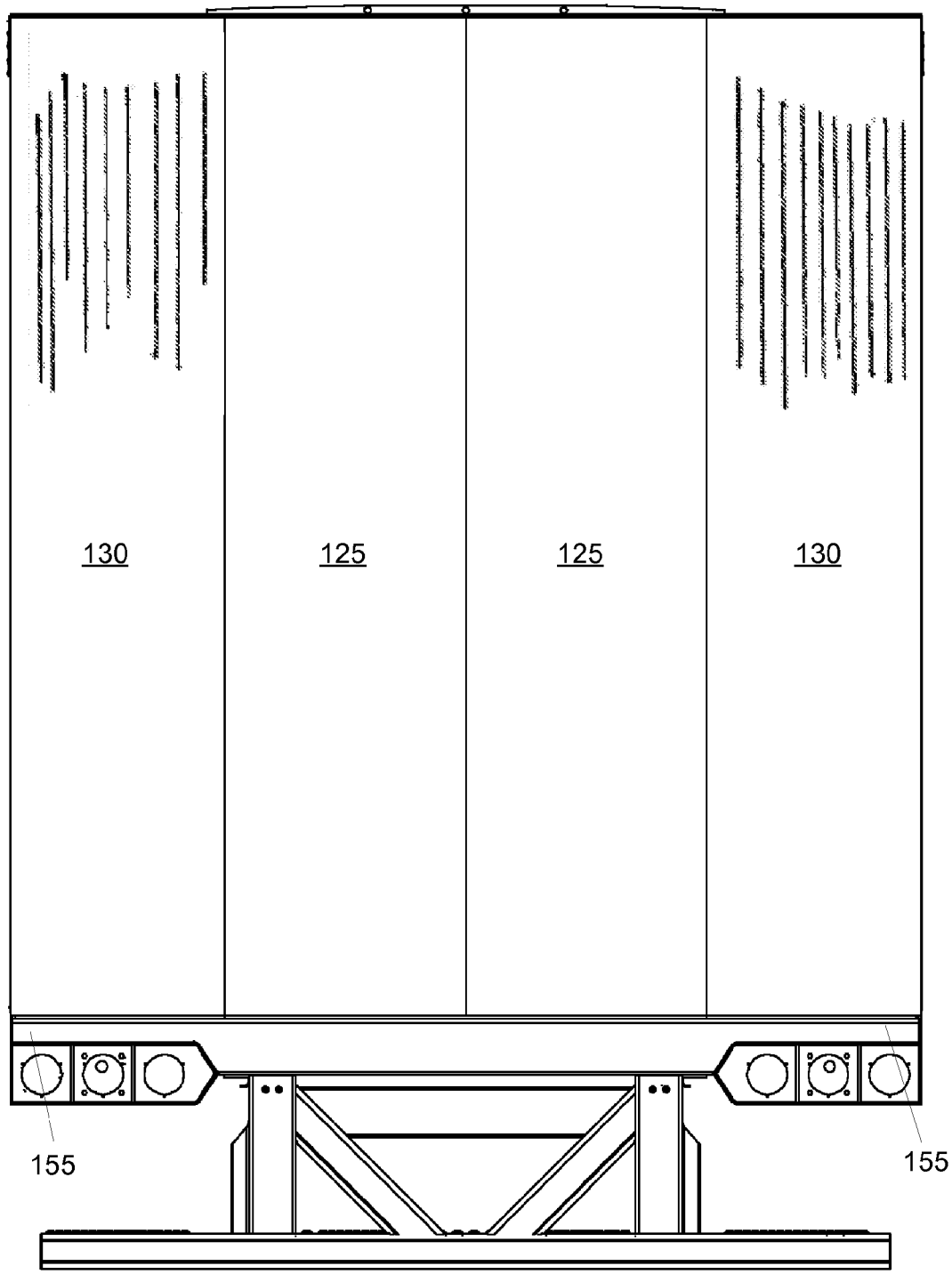
FIG. 22 is a rear view of a trailer rear section.
Figure 23:
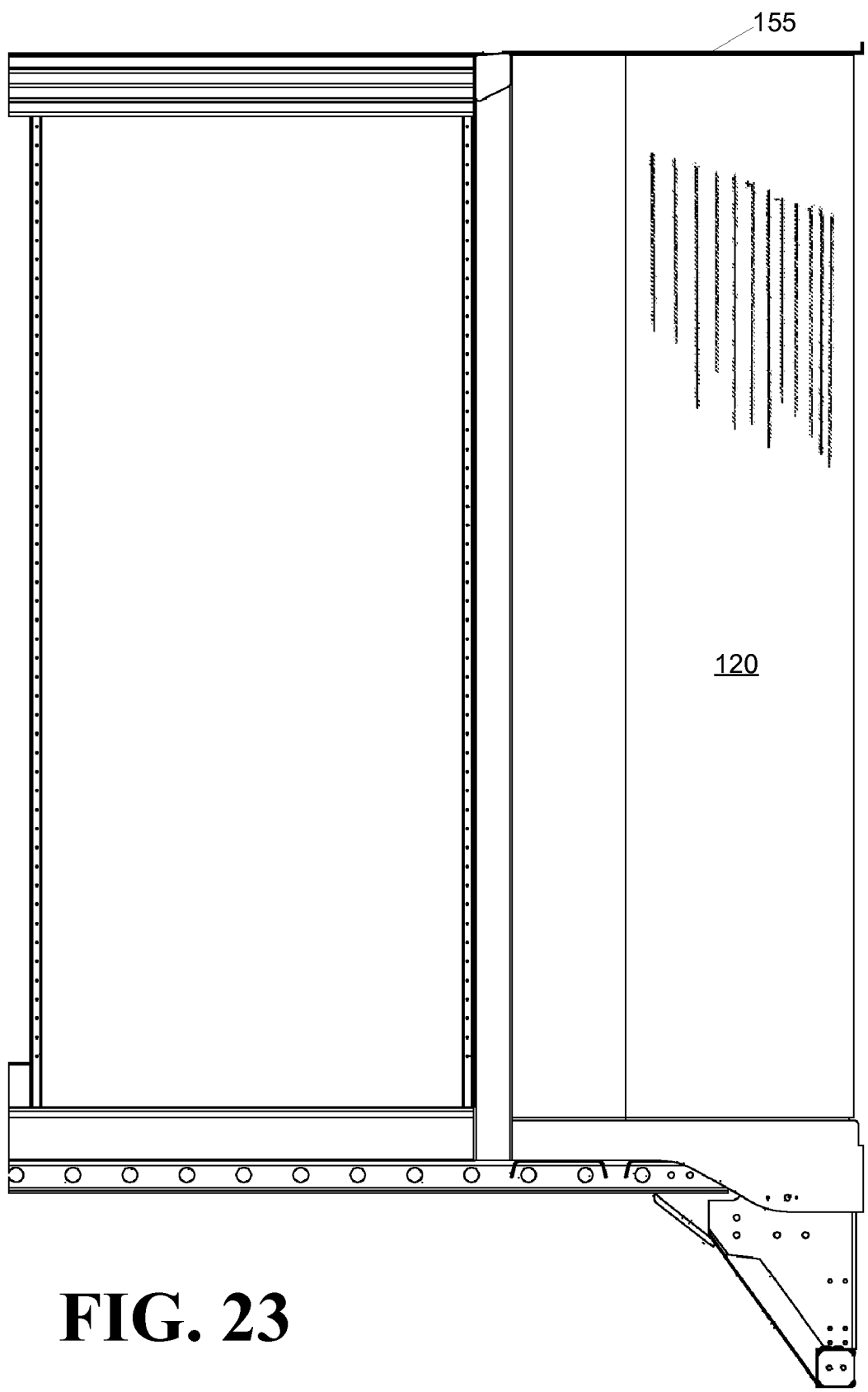
FIG. 23 is a side elevational view of a trailer rear section.

FIG. 21 shows a view of the perspective view of the trailer where the internal structure 161 of the rounded overhang is revealed. FIGS. 22 and 23 show side and back views of the flexible trailer door in a closed state.

FIG. 24 shows a top view of the rear of the trailer with flexible doors secured together in a fully closed state 160. The doors are also shown in a fully open state 165, where slats of the door cooperate to form a substantially flat surface located near the sidewalls of the trailer. Also shown are a plurality of partially open states 170. The flexible doors do not have to be opened to the fully open state to remove cargo from the trailer; however the fully open state of the doors minimizes the total width of the trailer. FIG. 24A shows a cross section of a flexible door in a fully closed state where a plurality of pivoted slats 120 are cooperating to form a highly curved surface.

The flexible nature of the doors also allows the doors to be fully or partially opened when there is a minimal amount of space available, such as when multiple trailers are docked at a loading bay.

Figure 25:
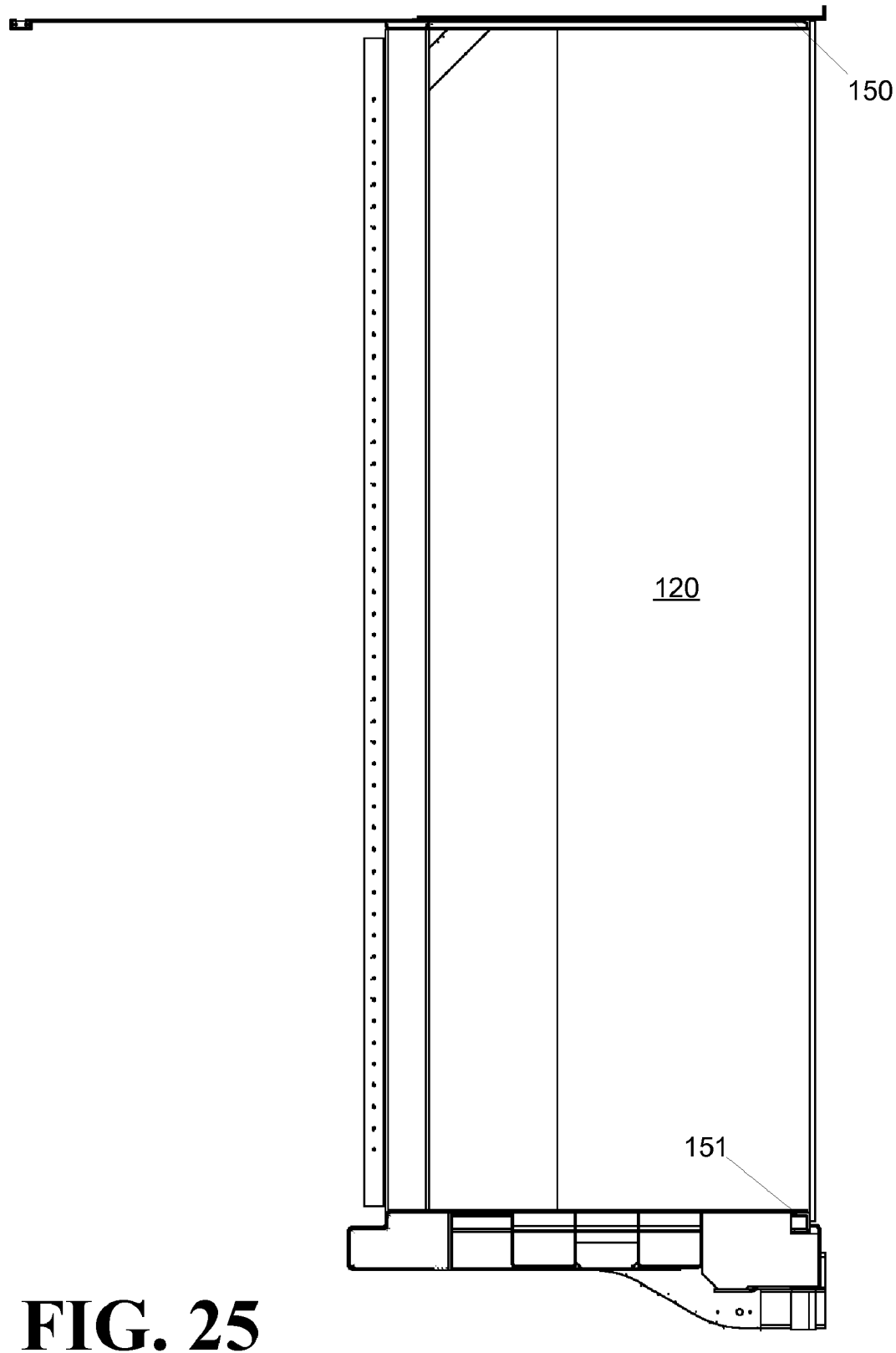
FIGS. 25-30 are various views showing frame edges at the top and bottom which the doors.
Figure 26:
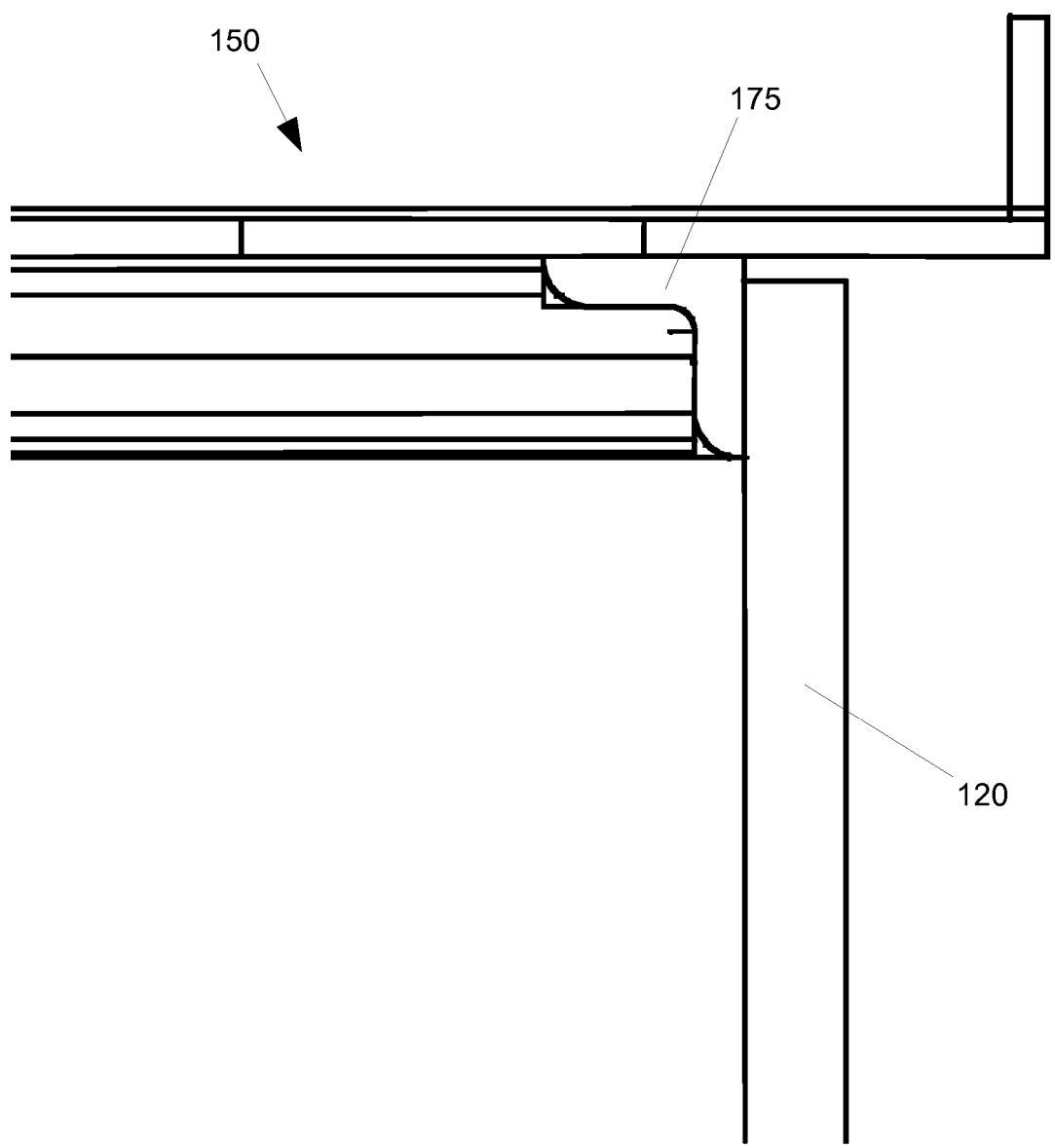
Figure 27:
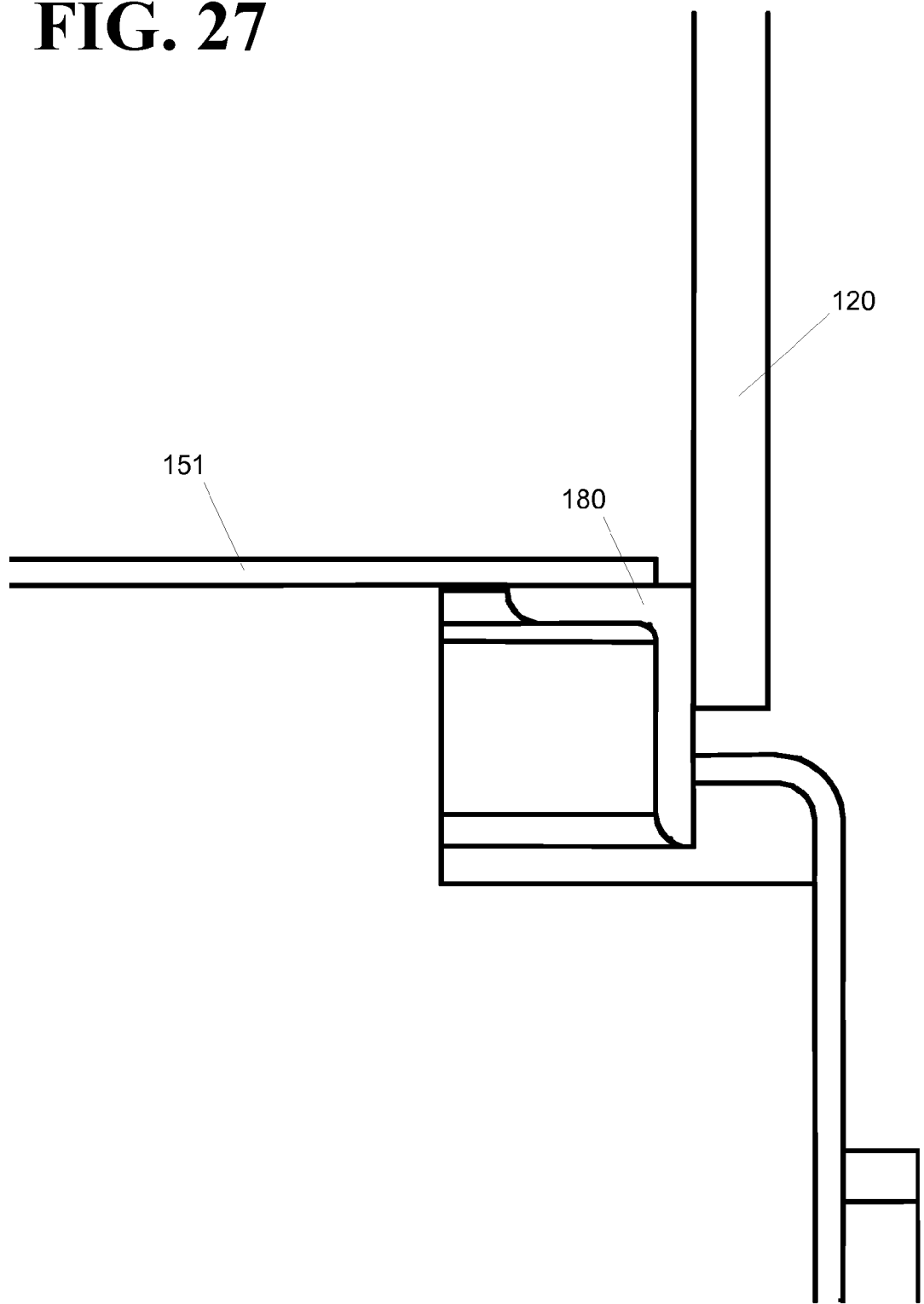

FIG. 25 shows a cross section of a trailer with pivoted slat 120 in contact with a rounded overhang 150 and a trailer floor 151. FIG. 26 is a close view of the interconnection of the slat and the overhang. In the closed position, the slat abuts against an upper edge 175 of the rounded overhang. The connection between the upper edge and the slat may include waterproofing features to seal the connection. FIG. 27 is a zoomed view of the interconnection between the slat and the trailer floor of FIG. 25. The slat 120 abuts against a lower edge 180 of the trailer floor 151 in the closed position. Similar to the upper edge, the lower edge may have features to waterproof and seal the connection with the pivoted slats.

Figure 28:
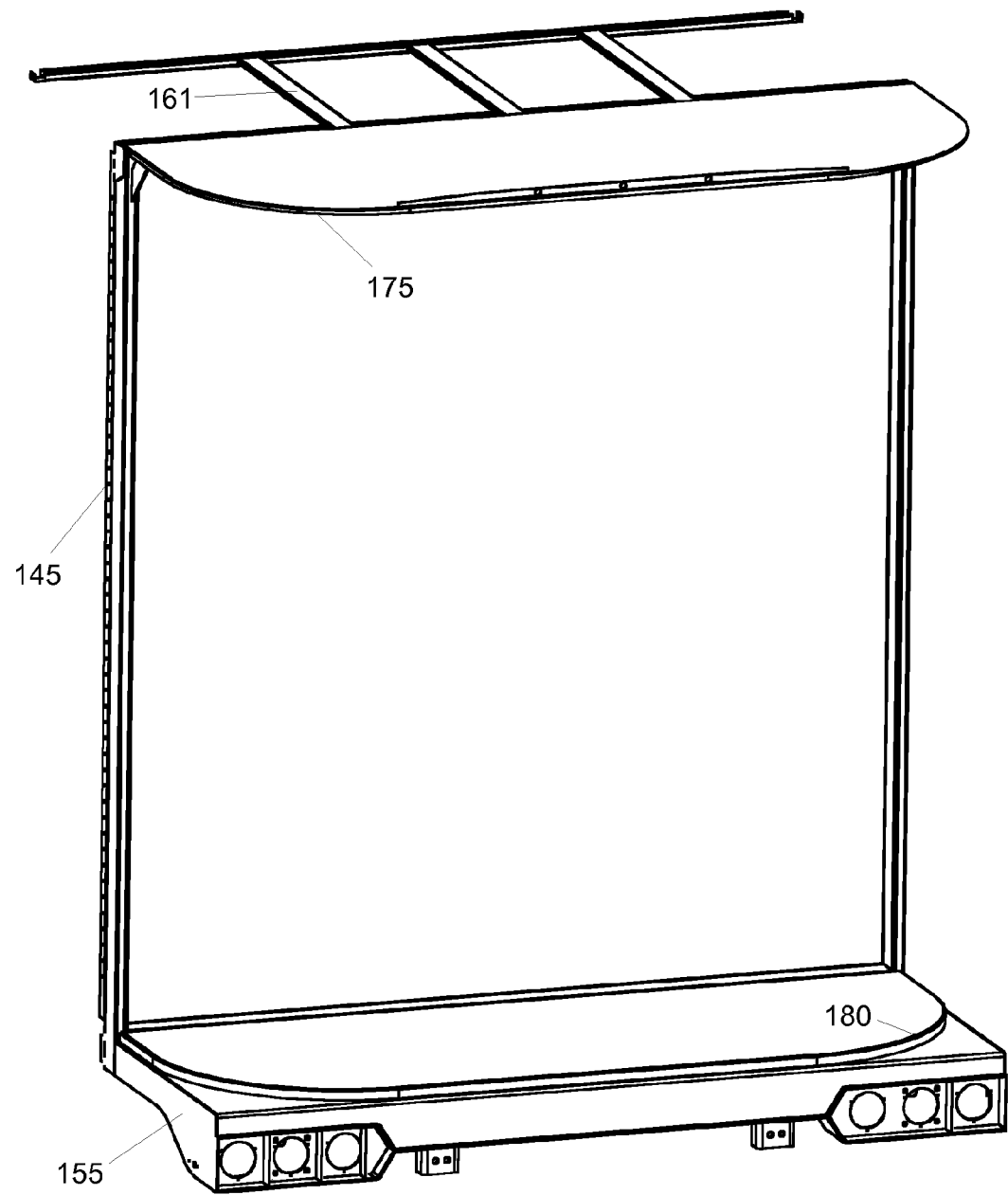
Figure 29:
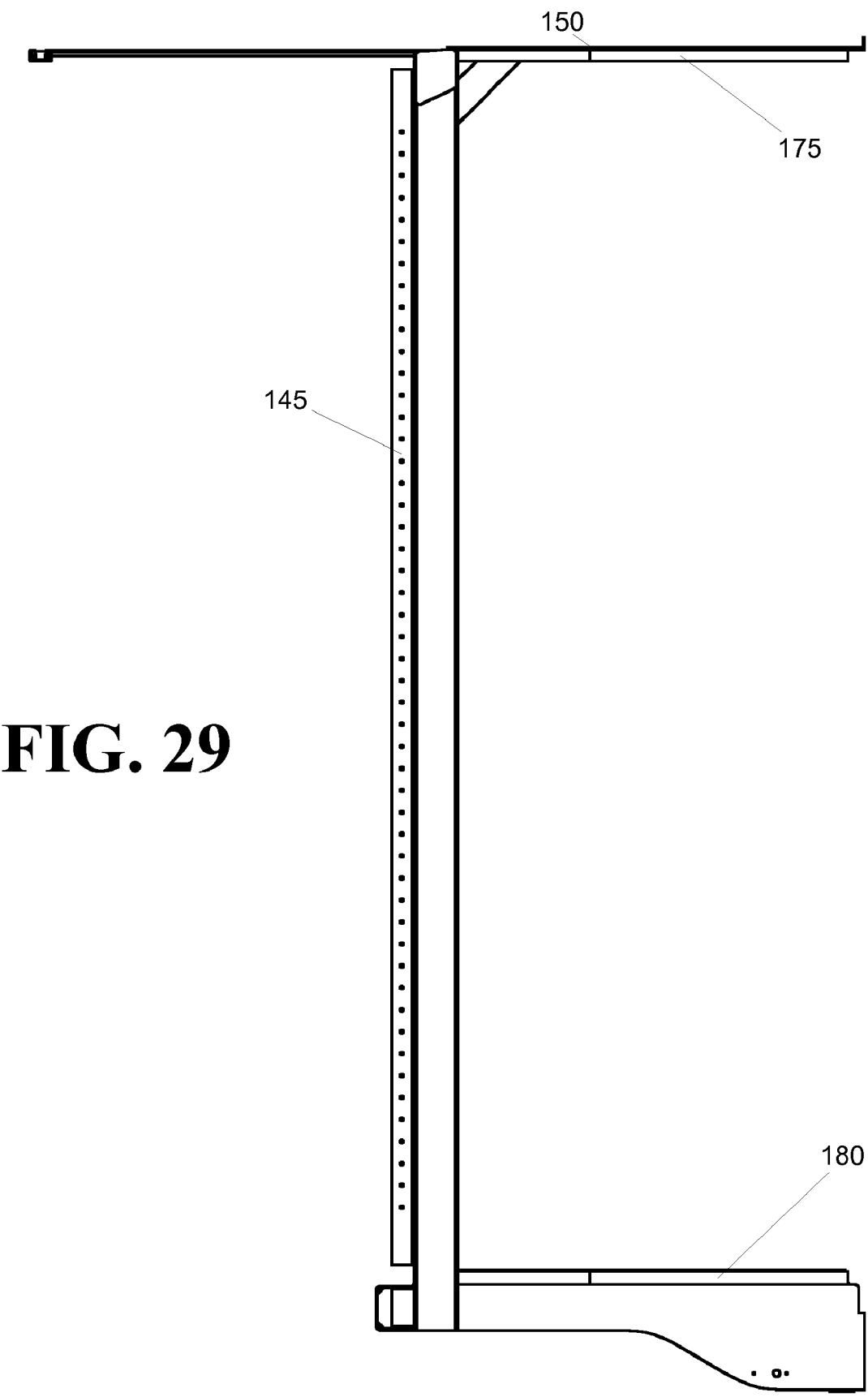
Figure 30:
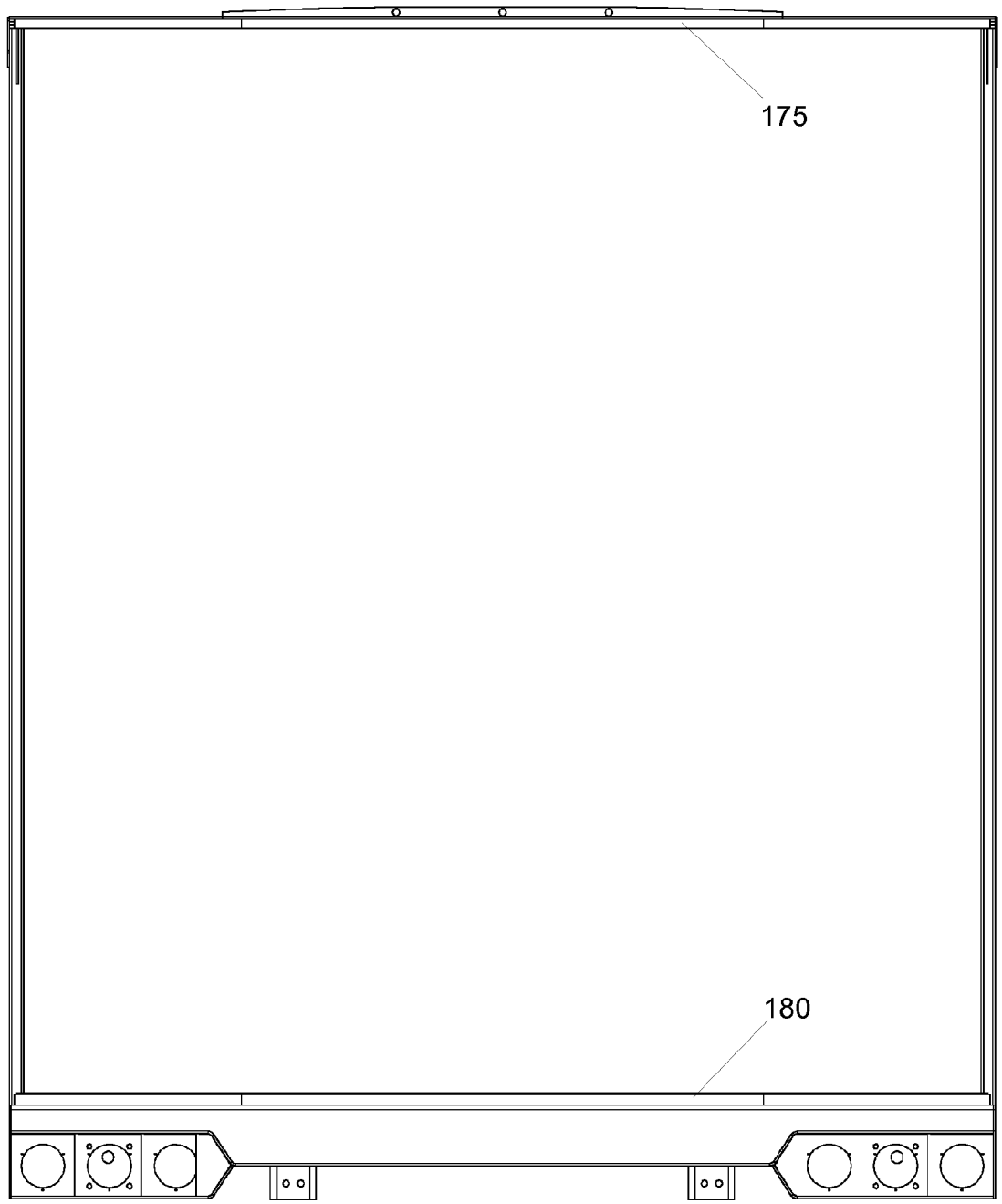

FIG. 28 shows a partial perspective view of the rear of a trailer showing the curvature of both the upper edge 175 and the lower edge 180. When the flexible door is in the fully closed state the pivoted slats abut against both the upper and lower curved edges. The edges substantially shape the orientation of the pivoted slats of the flexible door when the door is in a fully closed state. Brake lights are shown behind the raised curved edge. The surface between the raised curved edge and the brake lights is substantially flat to allow the slatted doors to be opened. FIGS. 29 and 30 are side and back views of the trailer of FIG. 28 where the upper edge 175 and the lower edge 180 are shown.

It should be understood that the programs, processes, methods and system described herein are not related or limited to any particular type components unless indicated otherwise. Various combinations of general purpose, specialized or equivalent components may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. The inventors contemplate several alterations and improvements to the disclosed invention. Other alterations, variations, and combinations are possible that fall within the scope of the present invention. Although various embodiments of the present invention have been described, those skilled in the art will recognize more modifications that may be made that would nonetheless fall within the scope of the present invention. Therefore, the present invention should not be limited to the apparatus described. Instead, the scope of the present invention should be consistent with the invention claimed below.

We claim:

1. An over the road trailer comprising:
   (a) a trailer body having a ceiling and a floor connected by a front wall and two sidewalls, the trailer body having an interior adapted for the storage and transport of goods;
   (b) a landing gear assembly connecting to a front section of the floor of the trailer body;
   (c) a kingpin connecting to the front section of the of the floor of the trailer body;
   (d) a wheel assembly connecting to the floor of the trailer body;
   (e) the ceiling having a rear ceiling surface with a rear boundary substantially defined by a curved edge, and the curved edge having a chord substantially equal to the width of the trailer body;
   (f) a flexible door, wherein the flexible door in a closed position is adjacent to the curved edge; and
   wherein the rear ceiling surface is substantially horizontal, the floor includes a rear floor section, and
   the rear floor section includes a substantially horizontal floor surface that is both located below and substantially parallel to the substantially horizontal rear ceiling surface.

2. The over the road trailer of claim 1 wherein
   the flexible door in the closed position extends from the rear ceiling surface and to the rear floor section, and
   the curved edge is substantially a half circle.

3. The over the road trailer of claim 2 wherein
   in the closed position, substantially all of the flexible door is located directly between rear ceiling surface and the floor surface.

4. The over the road trailer of claim 1 wherein the rear section also includes
   a rear underride guard having
      a post connecting to the rear floor section,
      a bar connecting to the post, and
      the shape of the bar substantially defined by the perimeter of the curved edge.

5. The over the road trailer of claim 1 further comprising
   the trailer body having a front section with a front floor section, the front floor section having a composition similar to the rear floor section.

6. The over the road trailer of claim 1 further comprising
   the flexible door rotating about a hinge from the closed position to an open position,
   in the open position, substantially all of the flexible door having a plurality of slats forming a substantially flat surface located proximal to a sidewall of the trailer, and
   in the closed position, the plurality of slats of the flexible door forming a substantially curved surface having a curvature similar to the perimeter of the curved edge.

7. The over the road trailer of claim 6 further comprising
   in the closed position, each of the plurality of slats of the flexible door having a portion proximal to the roof boundary.

8. The over the road trailer of claim 7 further comprising
   the hinge having an end located proximal to the chord of the curved edge.

9. An over the road trailer comprising:
   (a) a landing gear assembly connecting to a front section of a trailer body;
   (b) a kingpin connecting to the front section of the trailer body;
   (c) wheel assembly connecting to a rear section of the trailer body; and
   (d) the rear section of the trailer body including
      a rounded edge with an edge curvature, a hinge connected to a sidewall, and a door with a plurality of hinged slats, the door rotatably connected to the hinge, the door having an open orientation and a closed orientation;
      in the open orientation of the door, the plurality of hinged slats cooperate to form a substantially flat surface proximal to the sidewall of the trailer body; and
      in the closed orientation of the door, the plurality of hinged slats cooperating to form a substantially curved door edge proximal to the rounded edge, the curved door edge having a door curvature substantially similar to the edge curvature.

10. The over the road trailer of claim 9 wherein the rounded edge is substantially horizontal.

11. An over the road trailer comprising:
    (a) a trailer body including a roof, a floor, and a door,
       the roof having a rounded rear portion,
       the door in a closed position both
          having a rounded horizontal cross section defined by the rounded rear portion and
          connecting between the floor and the roof,
    (b) a landing gear assembly connecting to the trailer body;
    (c) a kingpin connecting to the trailer body; and
    (d) a wheel assembly connecting the trailer body.

12. The over the road trailer of claim 11 further comprising
    the floor having a rectangular rear portion located below the rounded rear portion of the roof,
    the rounded rear portion including a chord with a width substantially equal to the width of the trailer body.

13. The over the road trailer of claim 12 further comprising
    the rectangular rear portion of the floor having
       a raised curved edge both
          extending towards the roof and
          horizontally defined by the rounded rear portion of the roof.

14. The over the road trailer of claim 13 further comprising
    the door in the closed position having a portion adjacent to the raised curved edge.

15. The over the road trailer of claim 14 further comprising
    the rectangular rear portion including a brake light.

16. The over the road trailer of claim 15 further comprising
    the rectangular rear portion having a flat surface extending between the bottom of the raised curved edge and the brake lights.

17. The over the road trailer of claim 16 further comprising
    a fixed position hinge located between the roof and the floor, the door rotatable about the fixed position hinge.

18. The over the road trailer of claim 17 further comprising
    the door having a plurality of hinged slats with bottom portions adapted for contacting the raised curved edge of the floor.

19. The over the road trailer of claim 18 further comprising
    a rear underride guard connected to the floor of the trailer and located below the raised curved edge of the floor.

20. The over the road trailer of claim 11 further comprising
    a fixed position hinge located between the roof and the floor, the door rotatable about the fixed position hinge.

* * * * *